United States Patent
Karamavruc et al.

(10) Patent No.: US 8,789,669 B2
(45) Date of Patent: Jul. 29, 2014

(54) TORQUE CONVERTER WITH IMPROVED TORQUE CONVERTER CLUTCH PERFORMANCE

(75) Inventors: Aliihasan Karamavruc, Wooster, OH (US); Patrick M. Lindemann, Wooster, OH (US); Paul Dougall, Copley, OH (US); Rashid Farahati, Copley, OH (US); Larry Chad Boigegrain, Copley, OH (US); Michael Clason, Wooster, OH (US); Layton Broome, Wooster, OH (US); Chad Mieczkowski, Pittsburgh, PA (US); Nathan Yensho, Norton, OH (US); David C. Avins, Burbank, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 302 days.

(21) Appl. No.: 13/165,141

(22) Filed: Jun. 21, 2011

(65) Prior Publication Data

US 2011/0315498 A1    Dec. 29, 2011

Related U.S. Application Data

(60) Provisional application No. 61/358,527, filed on Jun. 25, 2010.

(51) Int. Cl.
*F16H 45/02*    (2006.01)

(52) U.S. Cl.
USPC ............................ 192/3.29; 60/362

(58) Field of Classification Search
USPC ................................................ 60/365
See application file for complete search history.

(56) References Cited

U.S. PATENT DOCUMENTS

| | | | |
|---|---|---|---|
| 4,951,467 A | | 8/1990 | Walsh et al. |
| 5,575,363 A | * | 11/1996 | Dehrmann et al. ............ 192/3.3 |
| 5,669,474 A | * | 9/1997 | Dehrmann et al. .......... 192/3.29 |
| 6,085,879 A | * | 7/2000 | Ebinger et al. ................ 192/3.3 |
| 6,540,053 B2 | * | 4/2003 | Sasse ........................... 192/3.29 |
| 2004/0172936 A1 | | 9/2004 | Mueller et al. |

* cited by examiner

*Primary Examiner* — Rodney Bonck
(74) *Attorney, Agent, or Firm* — Simpson & Simpson, PLLC

(57) ABSTRACT

A torque converter, including: a cover; a first through bore for receiving a transmission input shaft; a clutch including a piston plate; a plurality of fasteners connected to the cover; and a plate connected to the cover. The plate includes a radially aligned wall including a plurality of openings in which the plurality of fasteners is disposed; a second through bore at least partially aligned, in an axial direction, with the first through bore; and a plurality fins extending from the radially aligned wall in the axial direction. Each fin includes a first end aligned with the first and second through bores in the axial direction. Each fin includes a second end disposed radially within the plurality of openings. A space, aligned with an axis of rotation for the torque converter and the second through bore, is formed between the respective first ends.

6 Claims, 14 Drawing Sheets

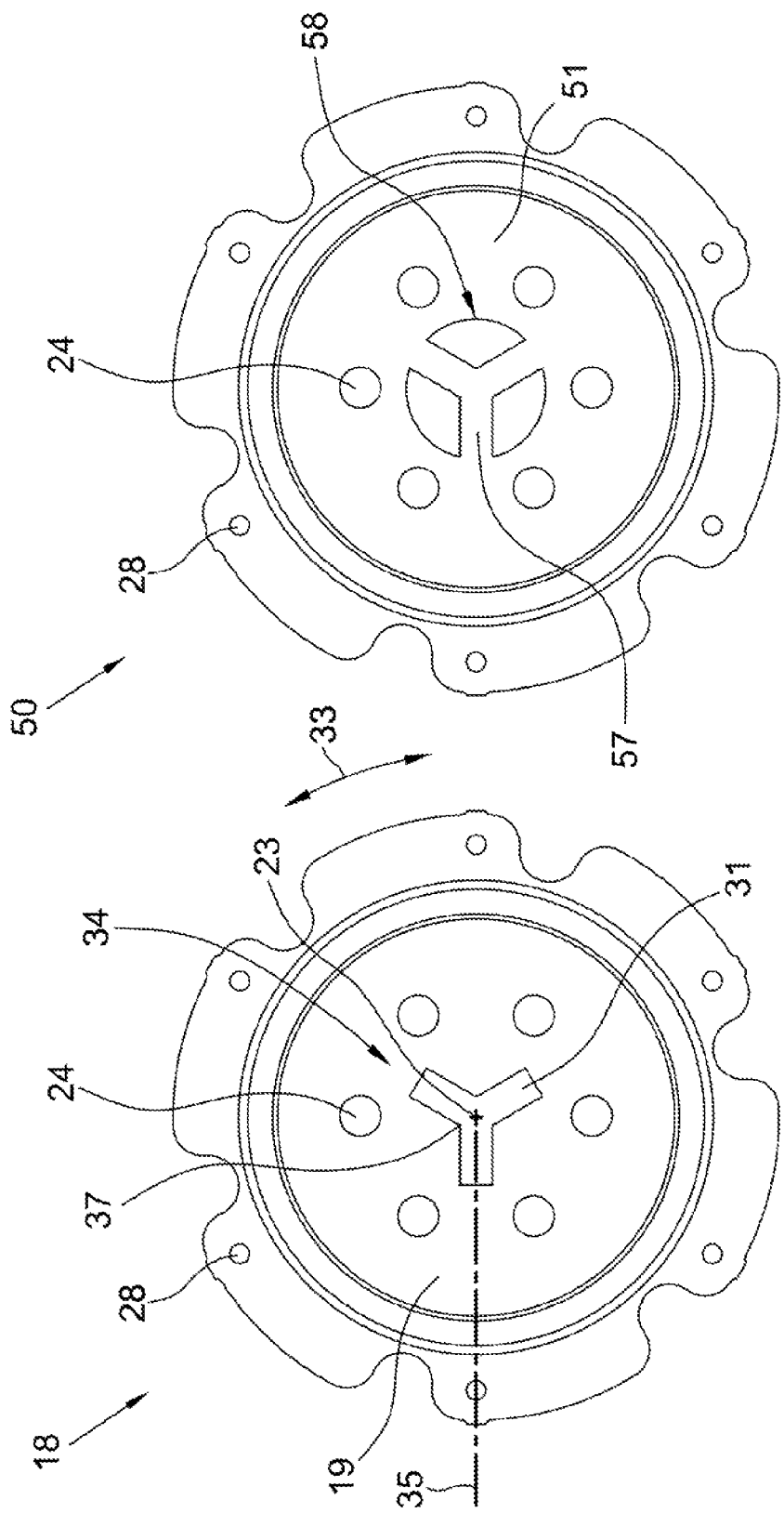

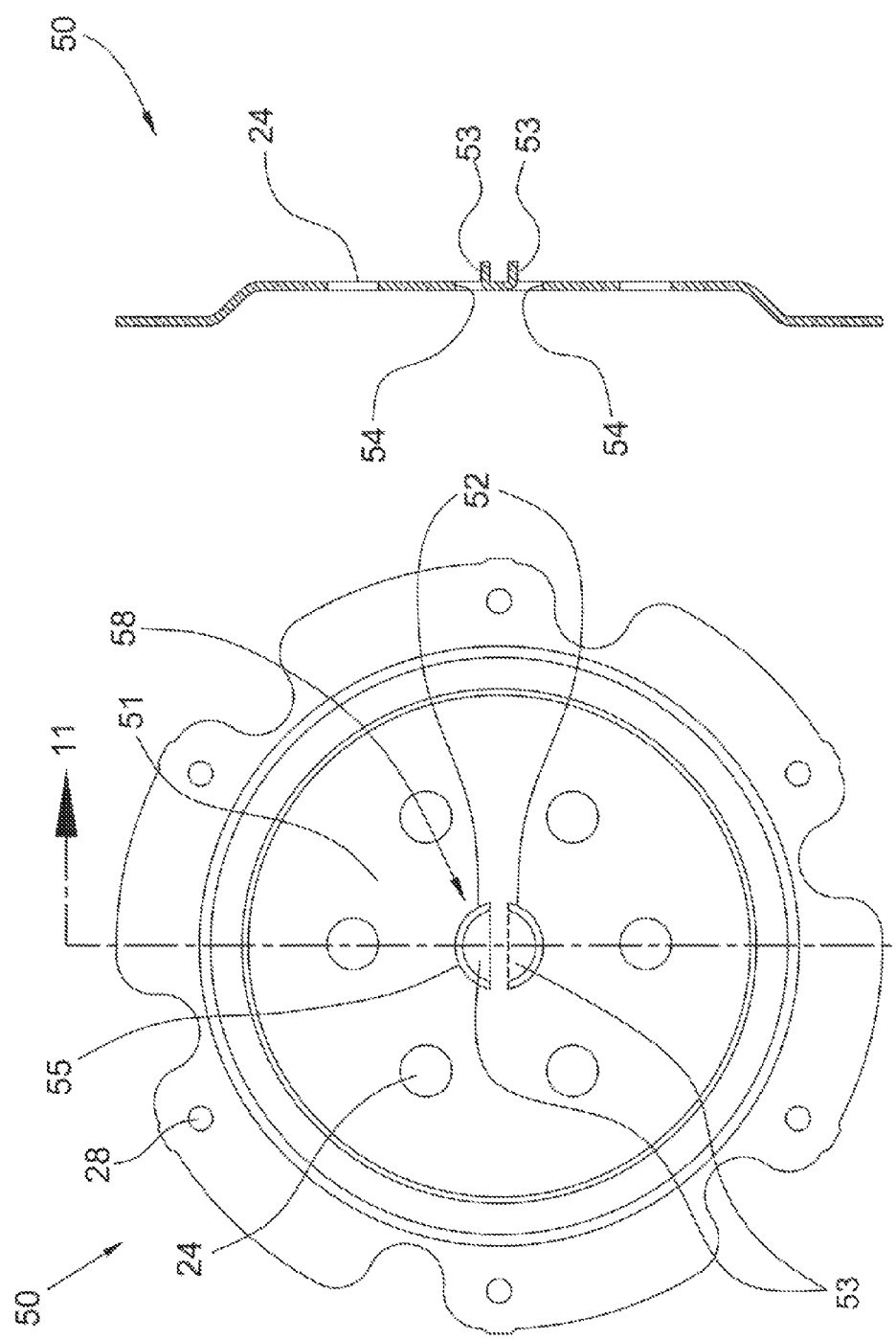

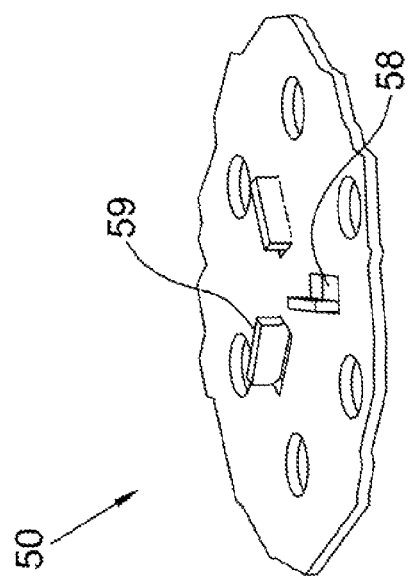
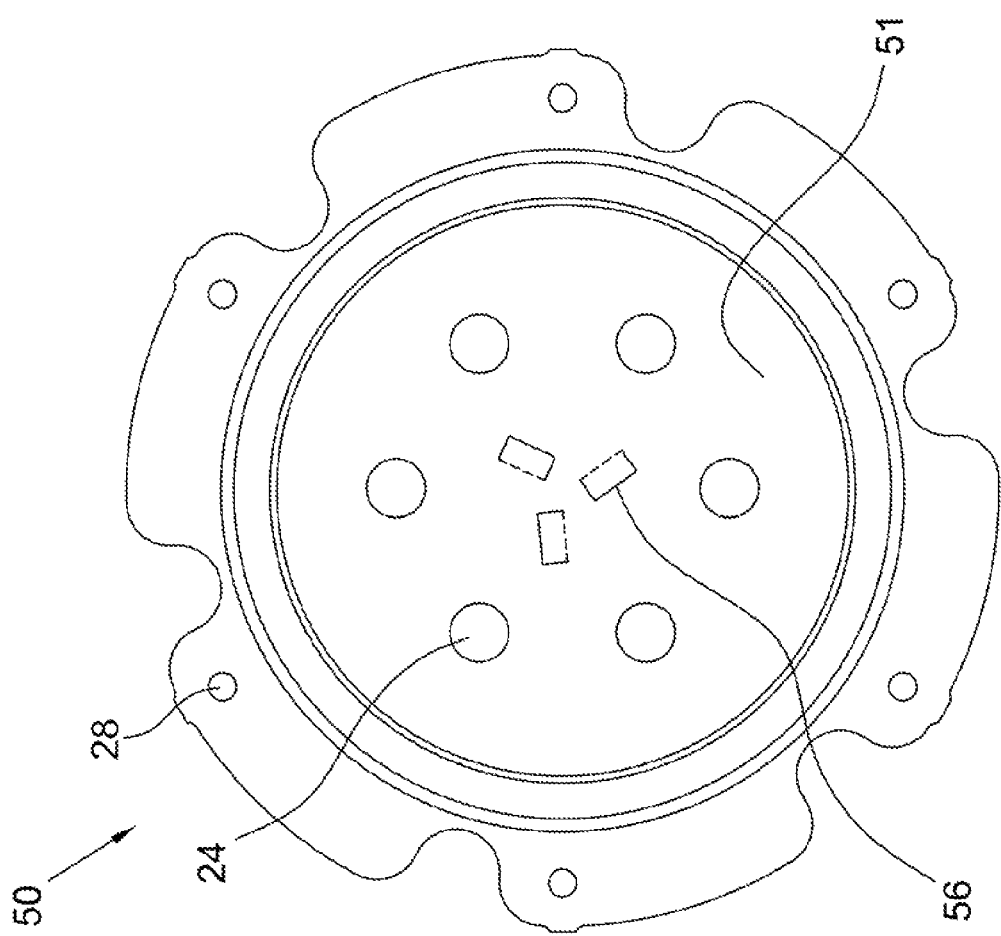

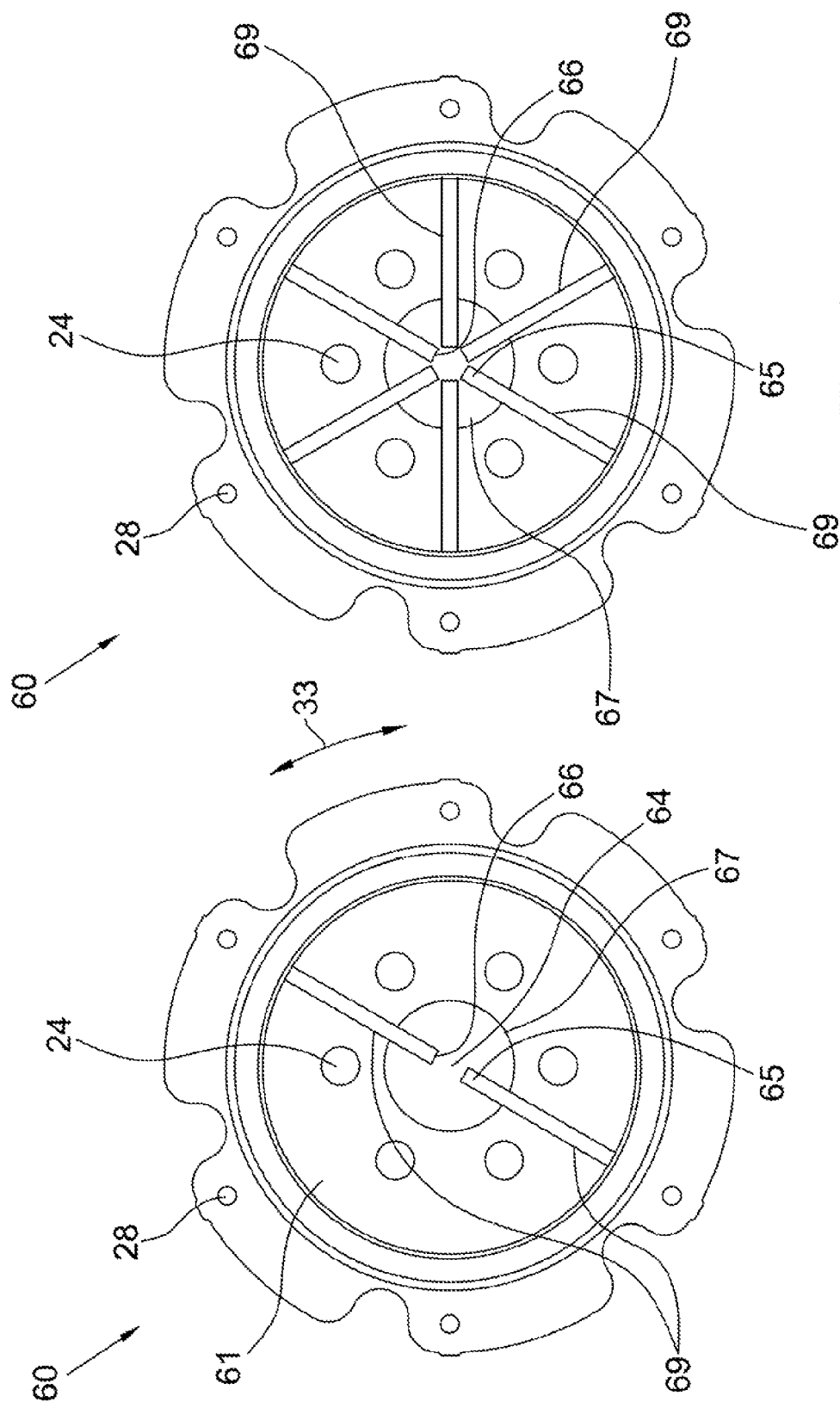

US 8,789,669 B2

TORQUE CONVERTER WITH IMPROVED TORQUE CONVERTER CLUTCH PERFORMANCE

CROSS-REFERENCE TO RELATED APPLICATIONS

This application claims the benefit under 35 U.S.C. §119 (e) of U.S. Provisional Patent Application No. 61/358,527 filed on Jun. 25, 2010 which application is incorporated herein by reference.

FIELD OF THE INVENTION

The invention broadly relates to wet clutches, more specifically to a plate or flow modification element for improving fluid flow from chambers for the wet clutch.

BACKGROUND OF THE INVENTION

Wet clutches are used to provide a mechanical by-pass for hydrodynamic coupling in torque converters in order to improve fuel economy for vehicles including the torque converters. Wet clutches also can be used without a torque converter in other coupling applications. The clutch is engaged and stays locked as soon as the vehicle is launched and stays locked in all kind of driving condition. A hydrodynamic force applies force to a piston plate for the clutch in order to engage and keep the clutch locked. This hydrodynamic force results from the differential pressure between apply and release pressures on either side of the piston plate. High engine speed creates high rotational velocity at the center of the torque converter which creates a Coriolis Effect. The Coriolis Effect on the disengagement side of the piston plate causes a resistance to oil flow out of the disengagement chamber for the clutch, which increases the piston plate back pressure, that is, pressure in the disengagement chamber. The increase in the piston plate back pressure causes a decrease in the differential pressure drop and subsequent drop in clutch torque capacity. Coriolis force increases with engine speed and has a significant effect in higher engine speeds. In other words wet clutches lose torque capacity at higher engine speed because of the Coriolis Effect.

FIG. 1 is a perspective view of a prior art drive plate 1 for a torque converter including radially aligned wall 2 and through bore 9. Plate 1 can be connected to a piston plate for a torque converter clutch in the torque converter via openings 7 and can be connected to a cover for the torque converter via openings 3. Bore 9 is circular.

U.S. Pat. No. 4,951,467 teaches grooves or protrusions on a cover for a torque converter with a torque converter clutch.

BRIEF SUMMARY OF THE INVENTION

According to aspects illustrated herein, there is provided a torque converter, including: a cover; a first through bore for receiving a transmission input shaft; a clutch including a piston plate; and a plate connected to the cover and including a radially aligned wall. The plate includes one of a second through bore in the radially aligned wall, the second through bore at least partially aligned, in an axial direction, with the first through bore; a plurality of third through bores in the radially aligned wall; or a fourth through bore in the radially aligned wall at least partially aligned with the first through bore. The second bore includes at least two slots, the slots being symmetrically spaced in a circumferential direction and being aligned with respect radii from an axis of rotation for the torque converter; or a protrusion from the radial wall forming a portion of a circumference of the second through bore. Each third through bore is at least partially aligned, in the axial direction, with the first through bore. For the fourth bore, the plate includes a plurality fins extending from the radially aligned wall in the axial direction and at least partially aligned with the turbine hub in the axial direction.

According to aspects illustrated herein, there is provided a torque converter, including: a cover including a recess aligned, in an axial direction, with an axis of rotation for the torque converter; a first through bore for receiving a transmission input shaft; a clutch including a piston plate; and a flow modification element. The flow modification element includes a first portion disposed in the recess for the cover and a plurality of flow bars extending, away from the first portion in the axial direction and radially outward from the first portion, into a space between the cover and the piston plate.

According to aspects illustrated herein, there is provided a torque converter, including: a cover; a first through bore for receiving a transmission input shaft; a clutch including a piston plate; a plurality of fasteners connected to the cover; and plate connected to the cover. The plate includes a radially aligned wall including a plurality of openings in which the plurality of fasteners is disposed; a second through bore, the second through bore at least partially aligned, in an axial direction, with the first through bore; and a plurality fins extending from the radially aligned wall in the axial direction. Each fin includes a first end aligned with the first and second through bores in the axial direction. Each fin includes a second end disposed radially within the plurality of openings. A space, aligned with an axis of rotation for the torque converter and the second through bore, is formed between the respective first ends.

BRIEF DESCRIPTION OF THE DRAWINGS

The nature and mode of operation of the present invention will now be more fully described in the following detailed description of the invention taken with the accompanying drawing figures, in which:

FIG. 5 is a front view of a the plate shown in FIG. 3;

FIG. 9 is an example embodiment of a plate for the torque converter shown in FIG. 3;

FIG. 10 is a front view of an example embodiment for the plate shown in FIG. 9;

FIG. 11 is a cross-sectional view of the plate shown in FIG. 10, generally along line 11-11 in FIG. 10;

FIG. 12 is a front view of an example embodiment for the plate shown in FIG. 9;

FIG. 13 is a detail of the plate shown in FIG. 12;

FIG. 14 is an example embodiment of the plate for torque converter 10 shown in FIG. 3;

FIG. 15 is an example embodiment of the plate for torque converter 10 shown in FIG. 3;

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 2A:
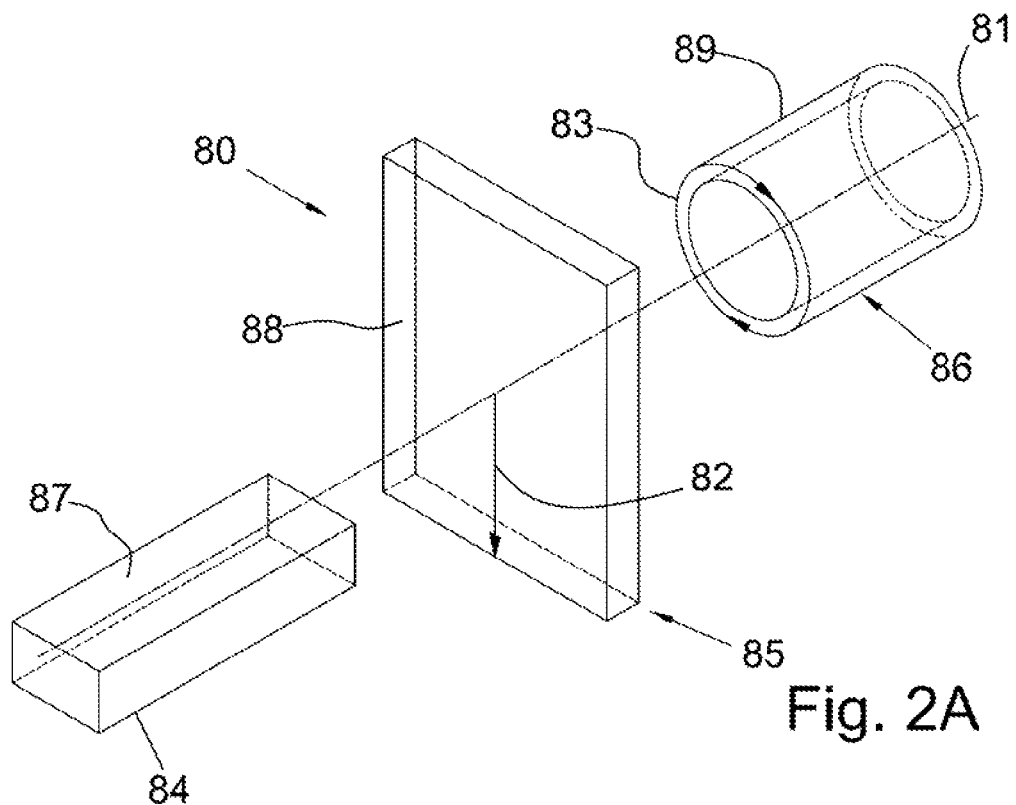
FIG. 2A is a perspective view of a cylindrical coordinate system demonstrating spatial terminology used in the present application.

FIG. 2A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1:
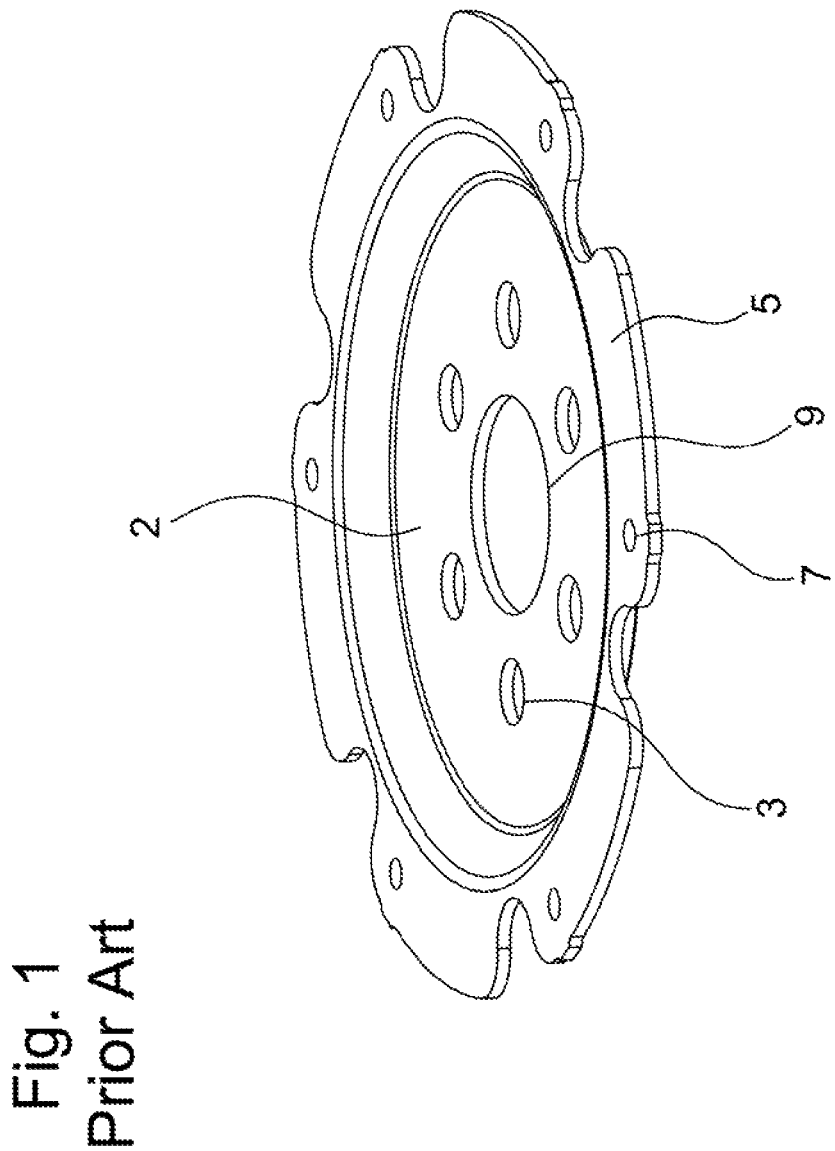
FIG. 1 is a perspective view of a prior art plate.
Figure 2B:
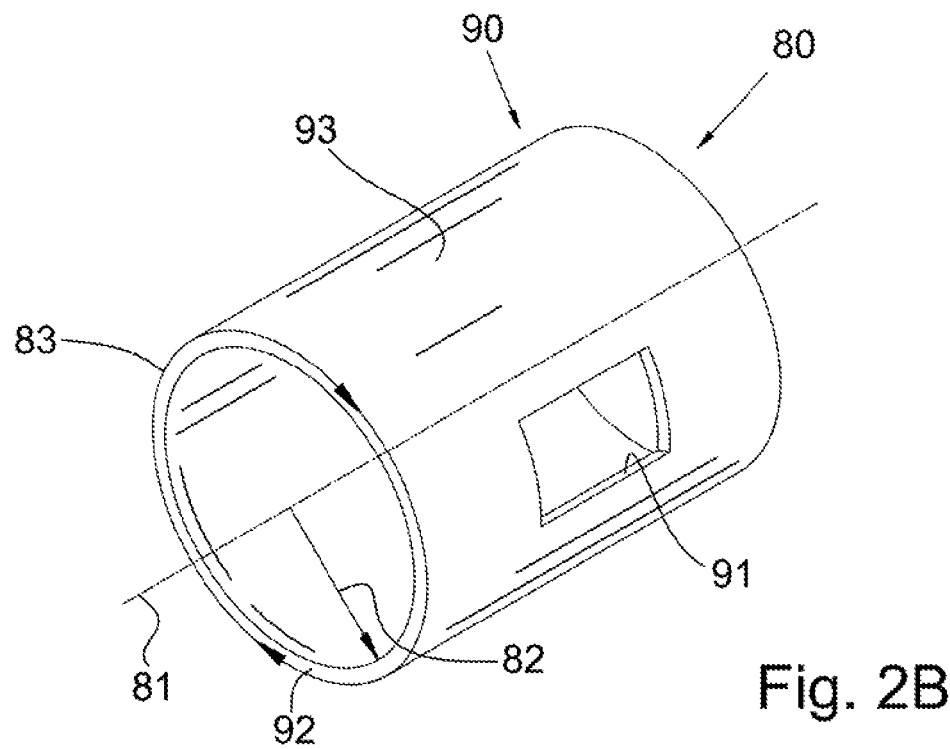
FIG. 2B is a perspective view of an object in the cylindrical coordinate system of FIG. 1A demonstrating spatial terminology used in the present application.

FIG. 2B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 3:
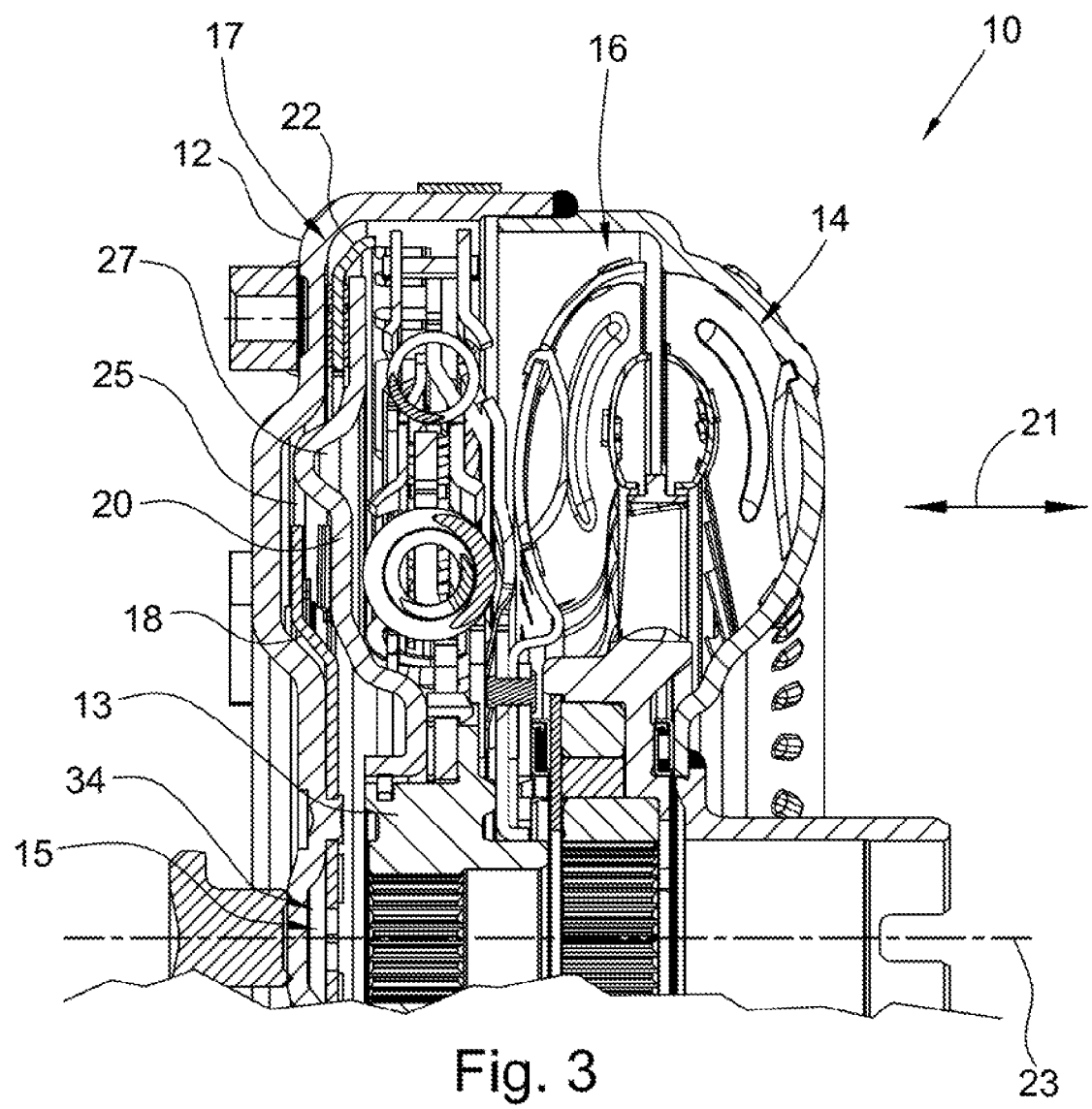
FIG. 3 is a partial cross-sectional view of a torque converter with a plate.

FIG. 3 is a partial cross-sectional view of torque converter 10 with plate 18.

Figure 4:
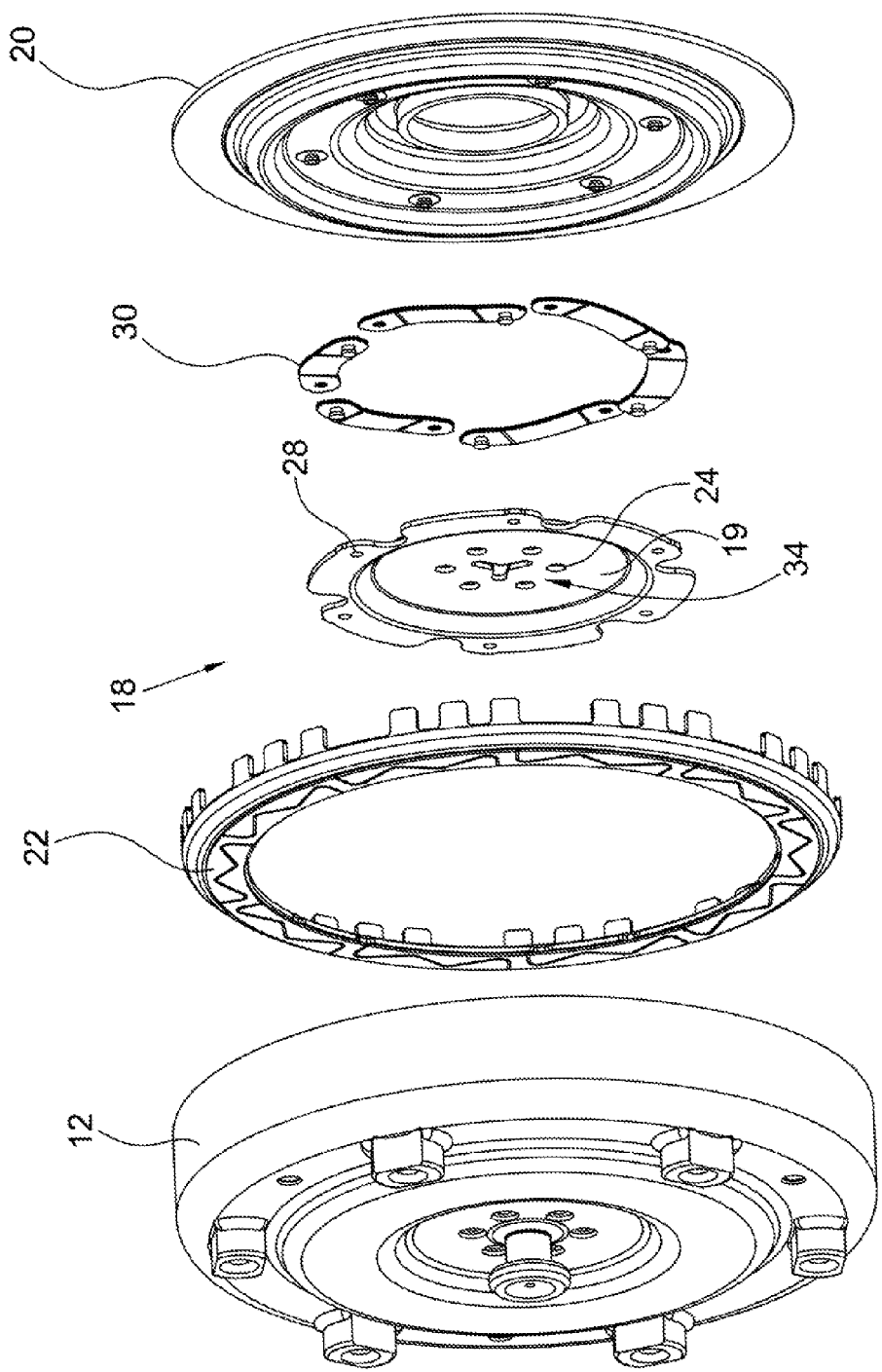
FIG. 4 is an exploded view of a portion of the torque converter shown in FIG. 3.

FIG. 4 is an exploded view of a portion of torque converter 10 shown in FIG. 3.

FIG. 5 is a front view of plate 18 shown in FIG. 3. The following should be viewed in light of FIGS. 3 through 5. Torque converter 10 includes cover 12; and through bore 15 for receiving a transmission input shaft (not shown). In one embodiment, through bore 15 is at least partially formed by turbine hub 13. The torque converter also includes clutch 17 including piston plate 20. In one embodiment, the torque converter includes plate 18 connected to the cover and including radially aligned wall 19. In one embodiment, the plate includes through bore 34 in the radially aligned wall. Through bore 34 is at least partially aligned, in axial direction 21, parallel to axis of rotation 23 for the torque converter, with through bore 15. In one embodiment, the torque converter also includes impeller 14, turbine 16, plate 22, and leaf springs 30.

In one embodiment, through bore 34 includes at least two slots 31 symmetrically spaced in circumferential direction 33. In one embodiment, the slots are aligned with respect to respective radii 35 from axis of rotation 23. In one embodiment, space 37 forming a portion of through bore 34 is aligned with the axis of rotation. It should be understood that plate 18 can be formed of any material known in the art, using any fabricating process known in the art. In one embodiment, plate 18 is a drive plate and is fastened to the piston plate by any means known in the art, for example, leaf springs 30 connected to the plate via fasteners in openings 28. In one embodiment, plate 18 is fastened to the cover by any means known in the art, for example, extruded rivets disposed in openings 24.

Figure 6:
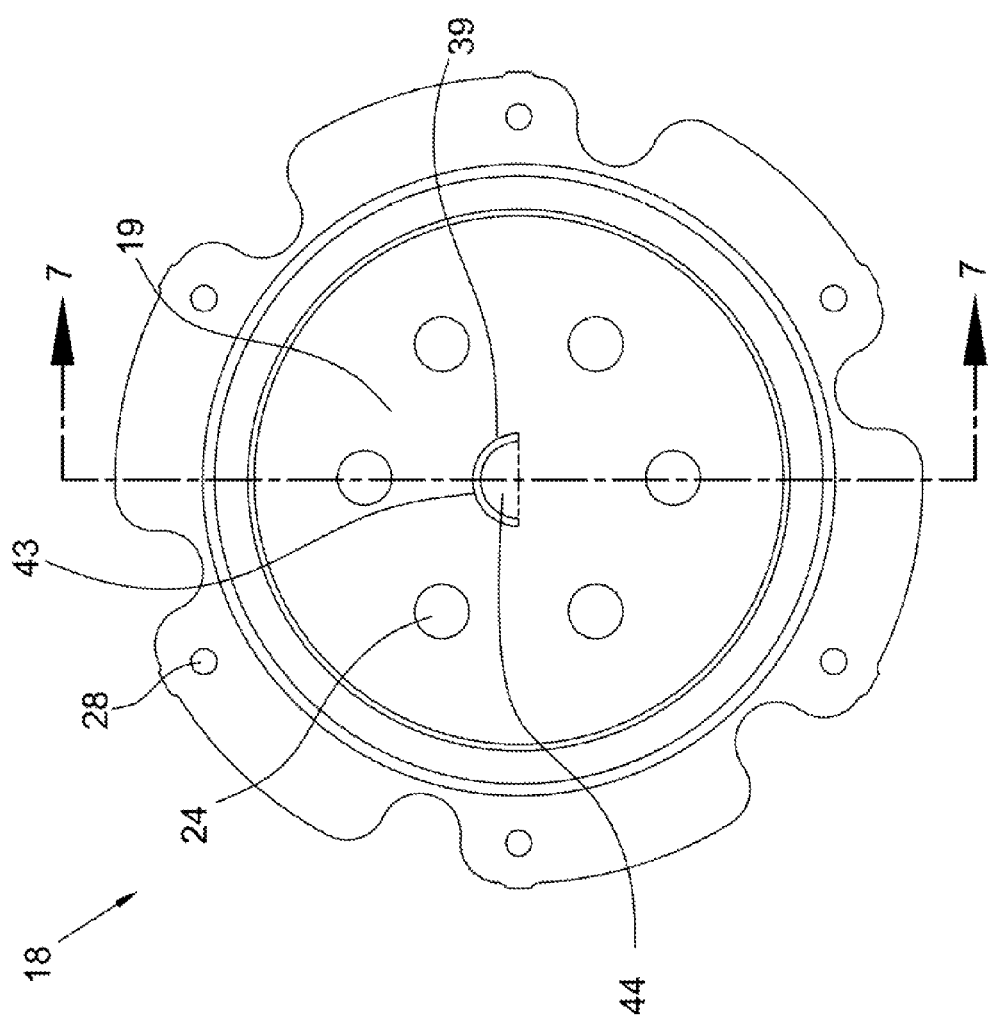
FIG. 6 is a front view of an example embodiment for the plate shown in FIG. 3.

FIG. 6 is a front view of an example embodiment for plate 18 shown in FIG. 3.

Figure 7:
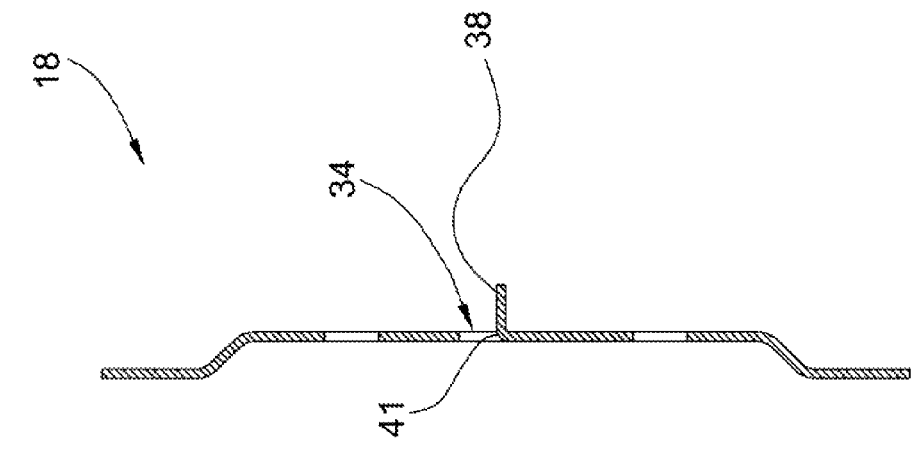
FIG. 7 is a cross-sectional view of the plate shown in FIG. 6, generally along line 7-7 in FIG. 6.

FIG. 7 is a cross-sectional view of plate 18 shown in FIG. 6, generally along line 7-7 in FIG. 6.

Figure 8:
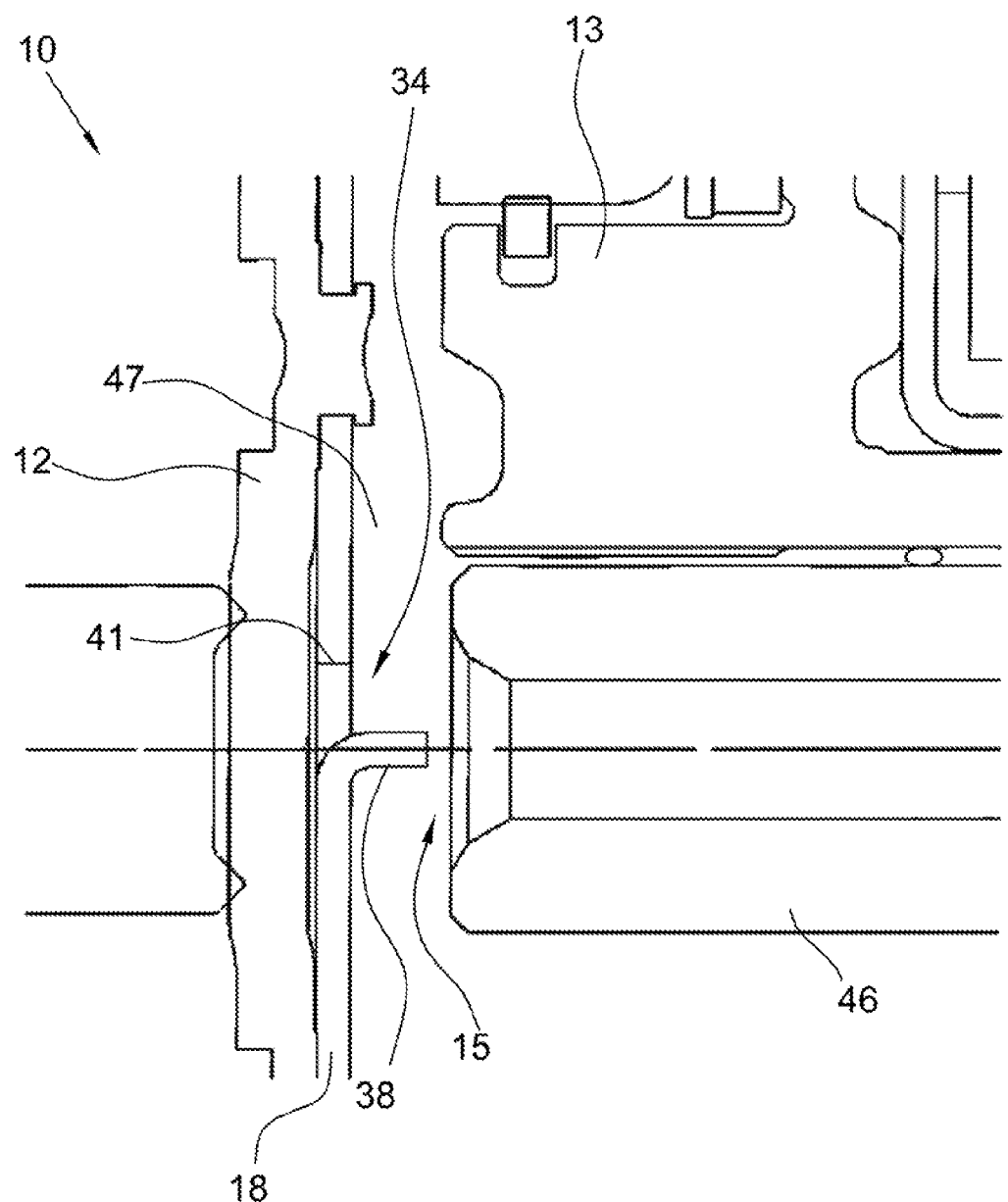
FIG. 8 is a partial cross-sectional view of the plate shown in FIG. 6 installed in the torque converter shown in FIG. 3.

FIG. 8 is a partial cross-sectional view of plate 18 shown in FIG. 6 installed in torque converter 10 shown in FIG. 3. The following should be viewed in light of FIG. 3-8. FIGS. 6 and 7 show a sequence of forming bore 34 and protrusion 38. In one embodiment, through bore 34 includes circumference 39 and the radial wall includes protrusion 38 formed from a same piece of material as the radial wall. Protrusion 38 is aligned with through bore 15 in the axial direction and forms portion 41 of the circumference of through bore 34. In one embodiment, slit 43 is punched in plate 18 as shown in FIG. 6 and segment 44 is bent to form the protrusion shown in FIG. 7. Transmission input shaft 46 is disposed in through bore 15 in FIG. 8.

As noted supra, high engine speed, and subsequent high rotation speed for a torque converter, such as torque converter 10, creates high rotational velocity at the center of the torque converter, for example, in and around through bore 15 and space 47 between a plate and the turbine hub. This velocity creates a Coriolis Effect on fluid, such as oil, in the torque converter. The Coriolis Effect in back of the piston plate, for example, in release chamber 25, causes a resistance to oil output flow from chamber 25 through a transmission shaft in through bore 15, which increases the piston plate back pressure, that is, the pressure in chamber 25. The back pressure increase in turn causes the differential pressure between chamber 25 and engage chamber 27 to drop, which in turn causes a drop in clutch torque capacity. Slots 31 and protrusion 38 work to disrupt the Coriolis effect noted above, which enables greater output flow from chamber 25, an increase in the differential pressure between chamber 25 and 27, and an increase in capacity for clutch 17. That is, the slots and the protrusion act to decrease oil flow speed proximate bore 15, which facilitates desired oil flow out of chamber 25.

FIG. 9 is an example embodiment of plate 50 for torque converter 10 shown in FIG. 3. The following should be viewed in light of FIGS. 3, 4, and 9. In one embodiment, the torque converter includes plate 50 connected to the cover and including radially aligned wall 51. Plate 50 includes a plurality of through bores 58 in radially aligned wall 51. Each through bore 58 is at least partially aligned, in the axial direction, with through bore 15. In one embodiment, the plurality of bores 58 consists of three bores, each through bore 58 has a same shape in a radial plane, and said through bore 58 has a same area in the radial plane. In one embodiment, circumferentially adjacent bores 58 are separated by respective divider portions 57 connected to the radial wall and radially aligned with the radial wall. Advantageously, in the embodiment of FIG. 9, there are no protrusions extending axially from plate 50, in particular, wall 51. Therefore, the embodiment of FIG. 9 takes up less axial space, which may advantageously reduce the axial space requirement for a torque converter using plate 50. In one embodiment, plate 50 is a drive plate fastened to the piston plate by any means known in the art, for example, leaf springs 30 connected to the plate via fasteners in openings 28. In one embodiment, plate 50 is fastened to the cover by any means known in the art, for example, extruded rivets disposed in openings 24.

FIG. 10 is a front view of an example embodiment for plate 50 shown in FIG. 9.

FIG. 11 is a cross-sectional view of plate 50 shown in FIG. 10, generally along line 11-11 in FIG. 10. The following should be viewed in light of FIGS. 3, 5, and 9-11. FIGS. 10 and 11 show a sequence of forming bores 58 and protrusions 53. In one embodiment, the plurality of through bores 58 includes two through bores with respective circumferences 52 and the radial wall includes protrusions 53 formed from a same piece of material as the radial wall. Protrusions 53 are aligned with through bore 15 in the axial direction and form respective portions 54 of the circumference of through bores 58. In one embodiment, slits 55 are punched in plate 50 as shown in FIG. 10 and protrusions 53 are bent to form the protrusions as shown in FIG. 11. Through bores 58 and protrusions 53 work to disrupt the Coriolis effect noted above, which enables greater output flow from chamber 25, an increase in the differential pressure between chamber 25 and 27, and an increase in capacity for clutch 17.

FIG. 12 is a front view of an example embodiment for plate 50 shown in FIG. 9.

FIG. 13 is a detail of plate 50 shown in FIG. 12. The following should be viewed in light of FIGS. 3, 5, 9, 12, and 13. FIGS. 12 and 13 show a sequence of forming bores 58 and protrusions 59. In one embodiment, the plurality of through bores 58 includes three through bores 58 and the radial wall includes protrusions 59 formed from a same piece of material as the radial wall. Protrusions 139 are aligned with through bore 15 in the axial direction. In one embodiment, segments 56 are punched from the radial wall, as shown in FIG. 12 and are bent to form protrusions 59 as shown in FIG. 13.

Through bores 58 and protrusions 59 work to disrupt the Coriolis effect noted above, which enables greater output flow from chamber 25, an increase in the differential pressure between chamber 25 and 27, and an increase in capacity for clutch 17.

FIG. 14 is an example embodiment of plate 60 for torque converter 10 shown in FIG. 3.

FIG. 15 is an example embodiment of plate 60 for torque converter 10 shown in FIG. 3. The following should be viewed in light of FIGS. 3, 4, 14, and 15. In one embodiment, the torque converter includes plate 60 connected to the cover and including radially aligned wall 61. Plate 60 includes through bore 67 in the radially aligned wall. Bore 67 is at least partially aligned with through bore 15. Plate 60 also includes a plurality fins 69 extending from the radially aligned wall in the axial direction and at least partially aligned with the turbine hub in the axial direction. In one embodiment, plate 60 includes two fins 69, as shown in FIG. 14. In one embodiment, plate 60 includes six fins 69, as shown in FIG. 15. In one embodiment, plate 60 is a drive plate fastened to the piston plate by any means known in the art, for example, leaf springs 30 connected to the plate via fasteners in openings 28. In one embodiment, plate 60 is fastened to the cover by any means known in the art, for example, extruded rivets disposed in openings 24.

In one embodiment, fins 69 are symmetrically disposed in circumferential direction 33. In one embodiment, portions 63 of the fins are not aligned with through bore 67. In one embodiment, portions 65 of the fins are aligned with through bore 67. In one embodiment, each fin 69 includes a respective distal end 66 axially aligned with through bore 67 and through bore 67 includes space 64, aligned with through bore 67 in the axial direction and formed between the respective distal ends. In one embodiment (not shown), ends 66 of the fins do not extend radially beyond openings 24.

Figure 16:
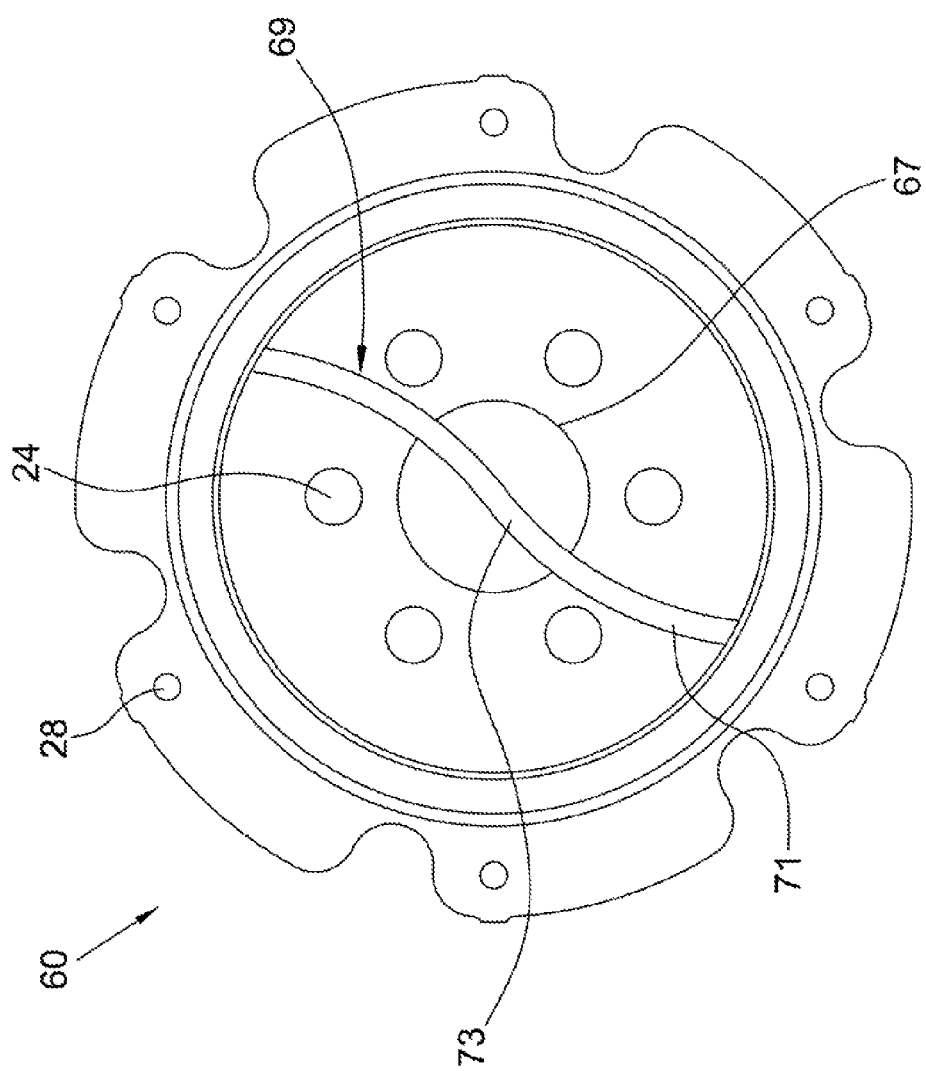
FIG. 16 is an example embodiment of the plate for torque converter 10 shown in FIG. 3.

FIG. 16 is an example embodiment of plate 60 for torque converter 10 shown in FIG. 3. The following should be viewed in light of FIGS. 3, 4, and 14-16. In one embodiment, plate 60 includes through bore 67 in the radially aligned wall and single fin 69 extending from the radially aligned wall in the axial direction and at least partially aligned with the turbine hub in the axial direction. In one embodiment, portions 71 of the fin are axially aligned with the radial wall and portion 73 of the fin is axially aligned with bore 67.

Through bore 67 and fins 69 work to disrupt the Coriolis effect noted above, which enables greater output flow from chamber 25, an increase in the differential pressure between chamber 25 and 27, and an increase in capacity for clutch 17.

Figure 17:
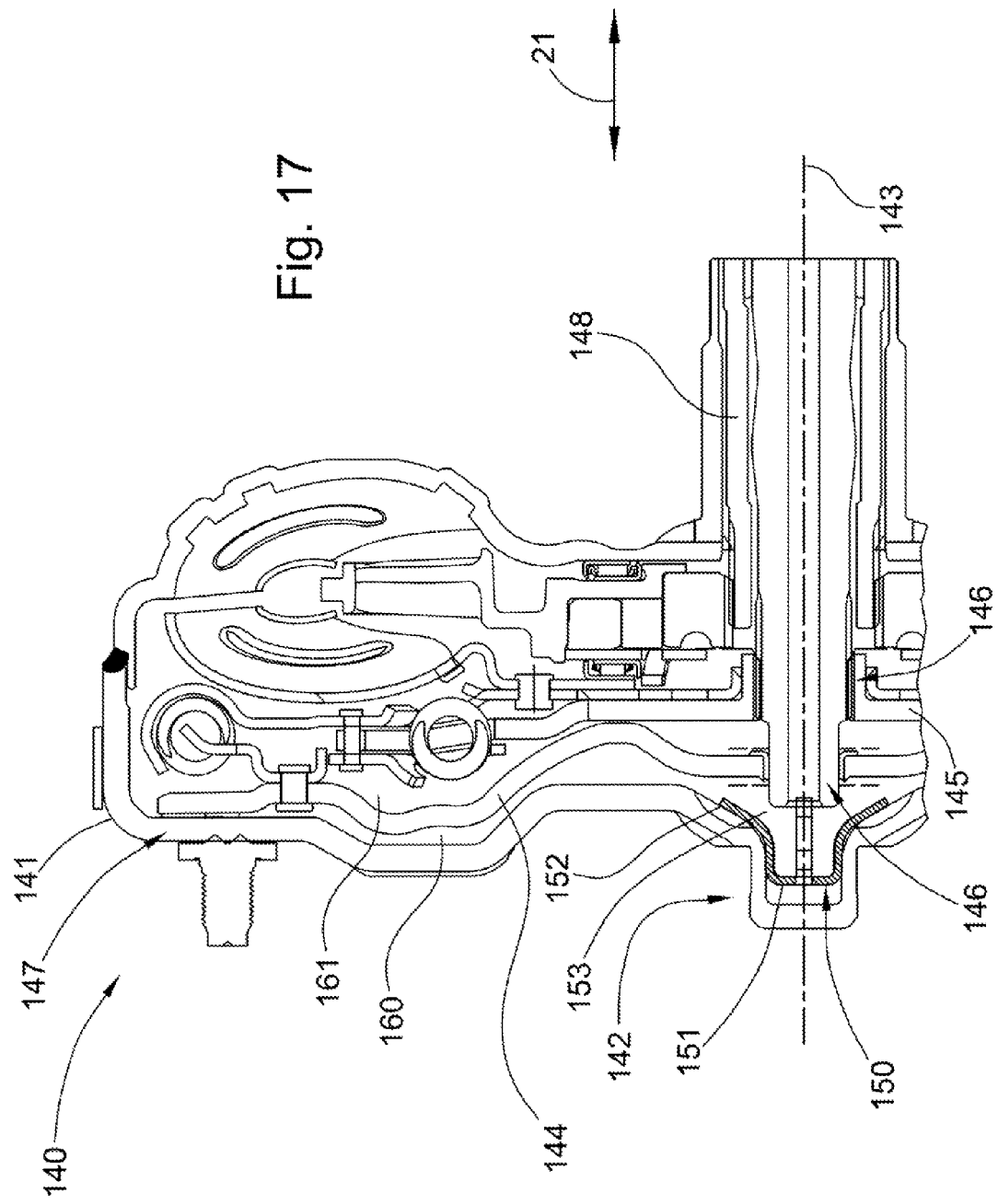
FIG. 17 is a partial cross-sectional view of a torque converter with a flow modifying element.

FIG. 17 is a partial cross-sectional view of torque converter 140 with flow modifying element 150.

Figure 18:
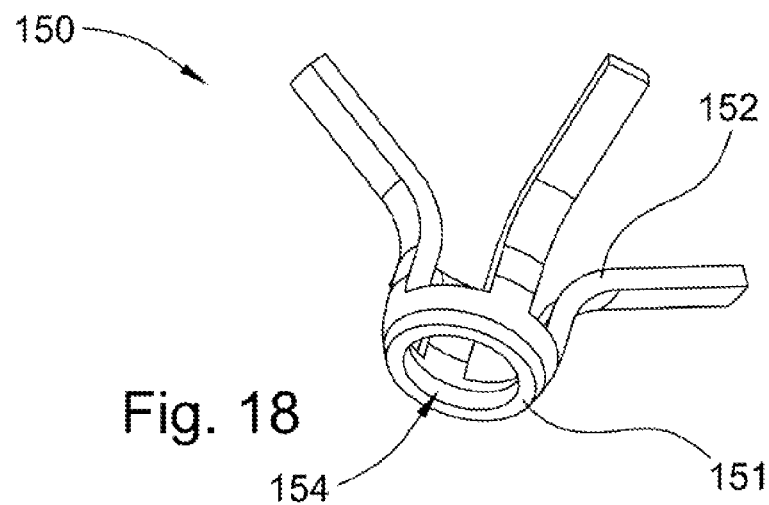
FIGS. 18 through 20 are example embodiments of the flow modifying element shown in FIG. 17.
Figure 19:
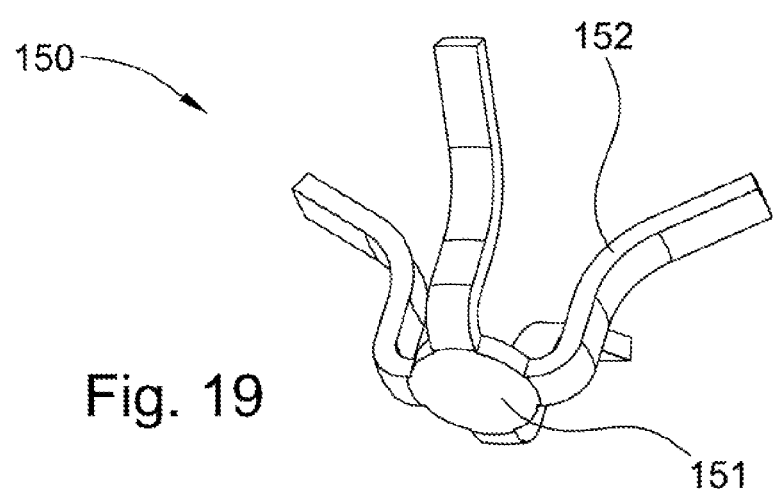
Figure 20:
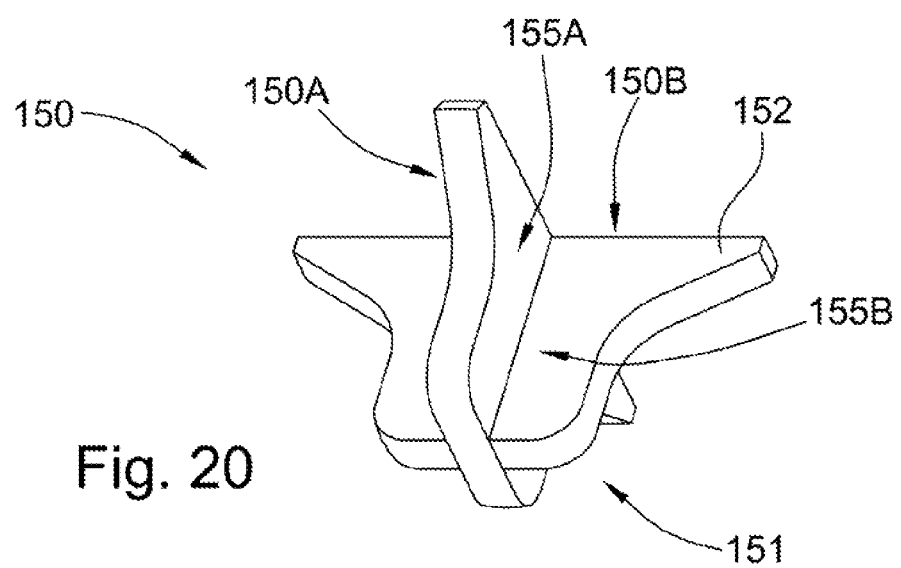

FIGS. 18 through 20 are example embodiments of flow modifying element 150 shown in FIG. 17. The following should be viewed in light of FIGS. 17 through 20. Torque converter 140 includes cover 141 with recess 142, aligned with axis of rotation 143 for the torque converter, and through bore 146. In one embodiment, the through bore is at least partially formed by damper hub 145. In FIG. 17, transmission input shaft 148 is disposed in the through bore. The torque converter also includes clutch 147 including piston plate 144. The torque converter includes flow modifying element 150 including portion 151 disposed in recess 142 and plurality of flow bars 152 extending away from the portion 142 in axial direction 21 and radially outward from portion 151 into space 153 between the cover and the piston plate. In one embodiment, element 150 is press-fit into cover 147.

In one embodiment, portion 151 is in a ring shape with through bore 154 at least partially aligned with bore 146 in axial direction 21, as shown in FIG. 18. In one embodiment, portion 151 is solid disc at least partially aligned with bore 146 in axial direction 21, as shown in FIG. 19. Although bars 152 are shown with a particular size and configuration, it should be understood that bars 152 are not limited to the size and configuration shown. Although element 150 is shown with four flow bars in FIGS. 18 and 19, it should be understood that element 150 is not limited to a particular number of flow bars.

In one embodiment, element 150 includes segments 150A and 150B as shown in FIG. 20. In one embodiment, segments 150A and 150B are each planar and are connected one to the other at central locations 155A and 155B, respectively. In one embodiment, segments 150A and 150B are notched at central locations 155A and 155B such that the segments are interlocked. In one embodiment, segments 150A and 150B are aligned with axis of rotation 151 such that segments 150A and 150B are orthogonal to each other with respect to the axis of rotation.

Through 151 and flow bars 152 work to disrupt the Coriolis effect noted above, which enables greater output flow from disengagement chamber 160, an increase in the differential pressure between chamber 25 and engagement chamber 161, and an increase in capacity for clutch 143.

Figure 21:
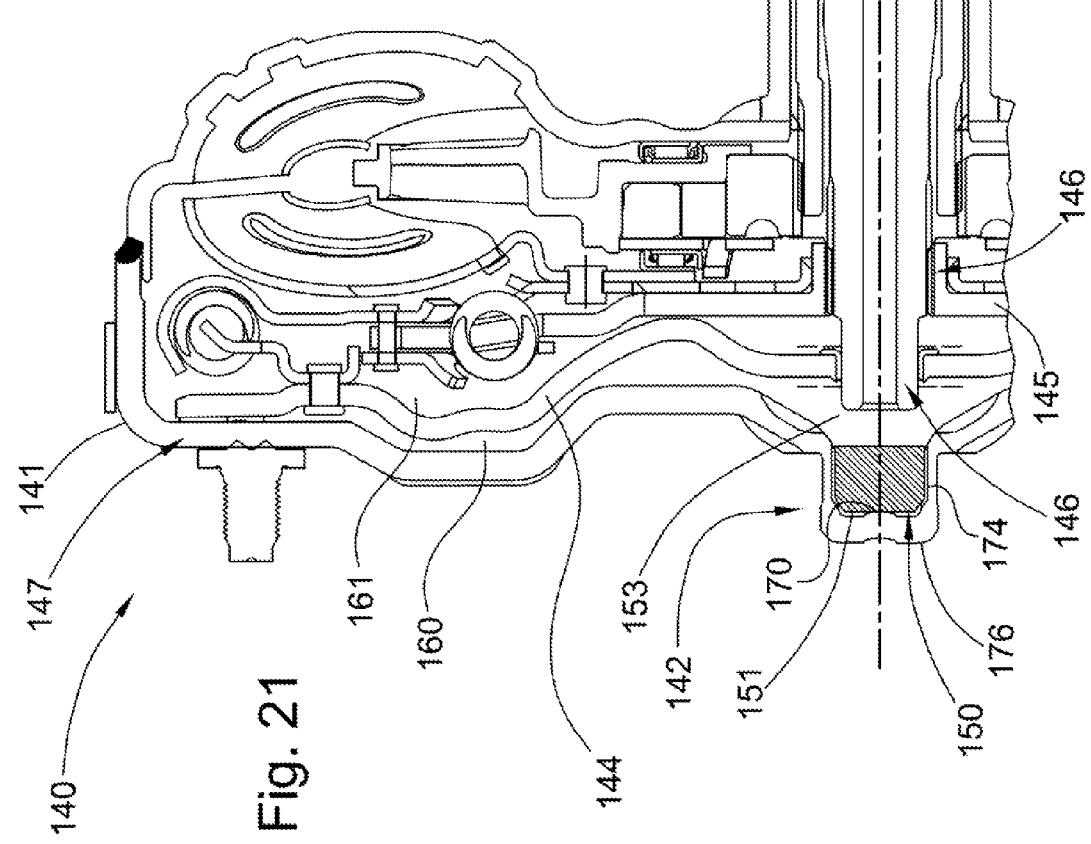
FIG. 21 is a partial cross-sectional view of a torque converter with a flow modifying element with a single segment and a projection weld; and, FIG. 22 is a back view of a portion of a cover with flow a modifying element positioned in slots in the recess.

FIG. 21 is a partial cross-sectional view of torque converter 140 with flow modifying element 150 with a single segment 150C and a projection weld. In one embodiment, element 150 includes a single segment 150C. Segment 150C is shaped like segment 150A or 150B. In one embodiment, segment 150C does not include the interlocking feature of segments 150A/B. Cover 147 is formed with dimple 170, facing through bore 146, and segment 150C is placed in recess 142 without a press fit. Projection welding is used to connect segment 150C to cover 142 at dimple 170. In one embodiment, segment 150C is placed in recess 142 such that the only contact with the cover is at the dimple, in order to obtain a proper current path for the projection welding.

Figure 22:
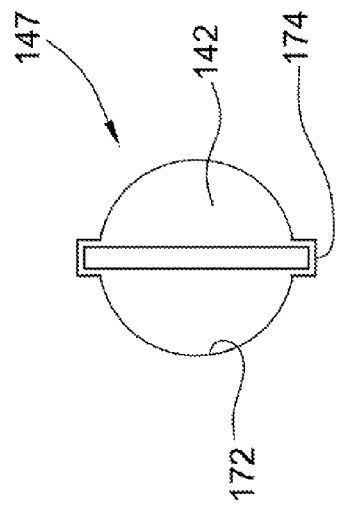

FIG. 22 is a back view of a portion of cover 147 with flow modifying element 150 positioned in slots in the recess. In one embodiment, inside surface 172 of the recess is formed with slots 174. In one embodiment, slots 174 are formed and segment 150C is placed in the slots such that the segment does not contact the cover at the slots. Projection welding is used to connect segment 150C to cover 142 at dimple 170.

In one embodiment, slots 174 are formed and segment 150C is placed in the slots such that the segment contacts the cover at the slots. In one embodiment, cover 147 does not include a dimple, such as dimple 170, and the segment does not contact front portion 176 of the cover. Projection welding is used to connect segment 150C to cover 142 at the slots. That is, the current path for the projection welding is through the contact of the segment with the cover at the slots, rather than through a dimple in portion 176.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

We claim:

1. A torque converter, comprising:
   a first through bore for receiving a transmission input shaft;
   a clutch including a piston plate; and,
   a plate connected to the cover and including a radially aligned wall and one of:
      a second through bore in the radially aligned wall, the second through bore at least partially aligned, in an axial direction, with the first through bore and including at least two slots, each of the at least two slots:
         being symmetrically spaced in a circumferential direction; and,
         being aligned with respect to a radius from an axis of rotation for the torque converter; or,
      a plurality of third through bores in the radially aligned wall, wherein each third through bore is at least partially aligned, in the axial direction, with the first through bore; or,
      a fourth through bore in the radially aligned wall at least partially aligned with the first through bore,
   wherein the plate includes a plurality fins extending from the radially aligned wall in the axial direction and at least partially aligned with a turbine hub in the axial direction; and:
      wherein the plate includes the second through bore and the circumference for the second through bore is semi-circular in shape; or,
   wherein:
      the plate includes the plurality of third through bores;
      the plurality of third through bores includes a pair of third through bores;
      the pair of third through bores includes respective circumferences;
      the radial wall includes first and second protrusions, formed from a same piece of material as the radial wall, aligned with the first through bore in the axial direction; and,
      the first and second protrusions form respective portions of the respective circumferences; or,
   wherein:
      the plate includes the plurality of third through bores;
      the plurality of third through bores consists of three third through bores;
      each third through bore has a same shape in a radial plane; and,
      said each third through bore has a same area in the radial plane; or,
   wherein:
      the plate includes the fourth through bore; and,
      the plurality of fins is not aligned with the fourth through bore in the axial direction; or,
   wherein:
      the plate includes the fourth through bore; and,
      the plurality of fins consists of two fins; or,
      the plurality of fins includes more than two fins; or,
   wherein:
      the plate includes the fourth through bore; and,
      the plurality of fins is symmetrically disposed in a circumferential direction; or,
   wherein:
      the plate includes the fourth through bore; and,
      the plurality of fins is at least partially aligned with the fourth through bore in the axial direction.

2. The torque converter of claim 1 wherein the plate includes the second through bore and the second through bore includes a space aligned with an axis of rotation for the torque converter.

3. The torque converter of claim 1 wherein circumferentially adjacent third through bores are separated by respective divider portions connected to the radial wall and radially aligned with the radial wall.

4. The torque converter of claim 1 wherein:
the plate includes the fourth through bore;
each fin includes a respective distal end axially aligned with the fourth through bore; and,
a space, aligned with the fourth through bore in the axial direction, is formed between the respective distal ends.

5. A torque converter, comprising:
a cover;
a first through bore for receiving a transmission input shaft;
a clutch including a piston plate;
a plurality of fasteners connected to the cover; and,
a plate connected to the cover and including:
  a radially aligned wall including a plurality of openings in which the plurality of fasteners is disposed;
  a second through bore, the second through bore at least partially aligned, in an axial direction, with the first through bore; and,
  a plurality fins extending from the radially aligned wall in the axial direction, wherein:
each fin includes a first end aligned with the first and second through bores in the axial direction;
said each fin includes a second end disposed radially inward of the plurality of openings; and,
a space, aligned with an axis of rotation for the torque converter and the second through bore, is formed between the respective first ends.

6. A torque converter, comprising:
an axis of rotation;
a first through bore for receiving a transmission input shaft;
a clutch including a piston plate; and,
a plate connected to the cover and including:
  a radially aligned wall with first and second surfaces facing in first and second axial directions, respectively; and,
  one of:
    a second through bore in the radially aligned wall, the second through bore at least partially aligned, in an axial direction, with the first through bore and including at least two slots, each of the at least two slots:
      passing through material forming the radially aligned wall to connect the first and second oppositely facing surfaces;
      being symmetrically spaced in a circumferential direction; and,
      being aligned with respect to a radius from an axis of rotation for the torque converter; or,
    a plurality of third through bores in the radially aligned wall, each third through bore:
      at least partially aligned, in the axial direction, with the first through bore; and,
      passing through material forming the radially aligned wall to connect the first and second oppositely facing surfaces; or,
    a fourth through bore in the radially aligned wall at least partially aligned with the first through bore and passing through material forming the radially aligned wall to connect the first and second oppositely facing surfaces, wherein:
the plate includes a plurality fins extending from the radially aligned wall in the axial direction and at least partially aligned with a turbine hub in the axial direction; and,
the second axial direction is opposite the first axial direction.

* * * * *